United States Patent
Luka et al.

(10) Patent No.: US 7,553,409 B2
(45) Date of Patent: Jun. 30, 2009

(54) REPLACEABLE LIQUID FILTER

(75) Inventors: Helmut Luka, Marbach (DE); Markus Kolczyk, Mundelsheim (DE); Dieter Schreckenberger, Marbach (DE); Rainer Loos, Freiberg (DE)

(73) Assignee: Mann & Hummel GmbH, Ludwigsburg (DE)

( * ) Notice: Subject to any disclaimer, the term of this patent is extended or adjusted under 35 U.S.C. 154(b) by 410 days.

(21) Appl. No.: 11/300,296

(22) Filed: Dec. 15, 2005

(65) Prior Publication Data

US 2006/0157394 A1 Jul. 20, 2006

(30) Foreign Application Priority Data

Dec. 16, 2004 (DE) .................. 10 2004 061 109

(51) Int. Cl.
*B01D 27/10* (2006.01)

(52) U.S. Cl. .................. 210/136; 210/234; 210/440; 210/DIG. 17

(58) Field of Classification Search .................. 210/133, 210/136, 248, 234, 440, DIG. 17
See application file for complete search history.

(56) References Cited

U.S. PATENT DOCUMENTS

| | | | | |
|---|---|---|---|---|
| 3,000,506 A | * | 9/1961 | Hultgren | .................. 210/133 |
| 4,052,307 A | | 10/1977 | Humbert, Jr. | |
| 5,236,064 A | * | 8/1993 | Wagoner | .................. 184/6.3 |
| 5,362,390 A | | 11/1994 | Widenhoefer et al. | |
| 5,766,451 A | * | 6/1998 | Sparling | .................. 210/136 |
| 6,068,763 A | * | 5/2000 | Goddard | .................. 210/130 |

FOREIGN PATENT DOCUMENTS

| | | |
|---|---|---|
| EP | 0 362 554 B1 | 9/1988 |
| GB | 2 208 068 A | 2/1989 |

OTHER PUBLICATIONS

European Search Report dated Feb. 17, 2006 (Six (6) pages) including English Translation of relevant portion.

* cited by examiner

*Primary Examiner*—Terry K Cecil
(74) *Attorney, Agent, or Firm*—Crowell & Moring LLP

(57) ABSTRACT

A replaceable liquid filter, particularly for the lubricating oil of an internal combustion engine, including a substantially cup-shaped housing with a concentrically arranged outlet opening for filtered liquid and at least one inlet opening for the liquid to be filtered, and a filter element disposed in a sealing manner in the housing between the inlet opening and the outlet opening. The housing is connected to a top plate, and the top plate is connected to an end plate. The top plate encloses a displacement space which is disposed in an inlet chamber in the mating part, such that the inlet opening in the top plate is disposed in the region of the displacement space and/or a backflow check valve is disposed in the area of the outlet opening such that the backflow check valve is positioned axially outside the effective filter element surface.

12 Claims, 4 Drawing Sheets

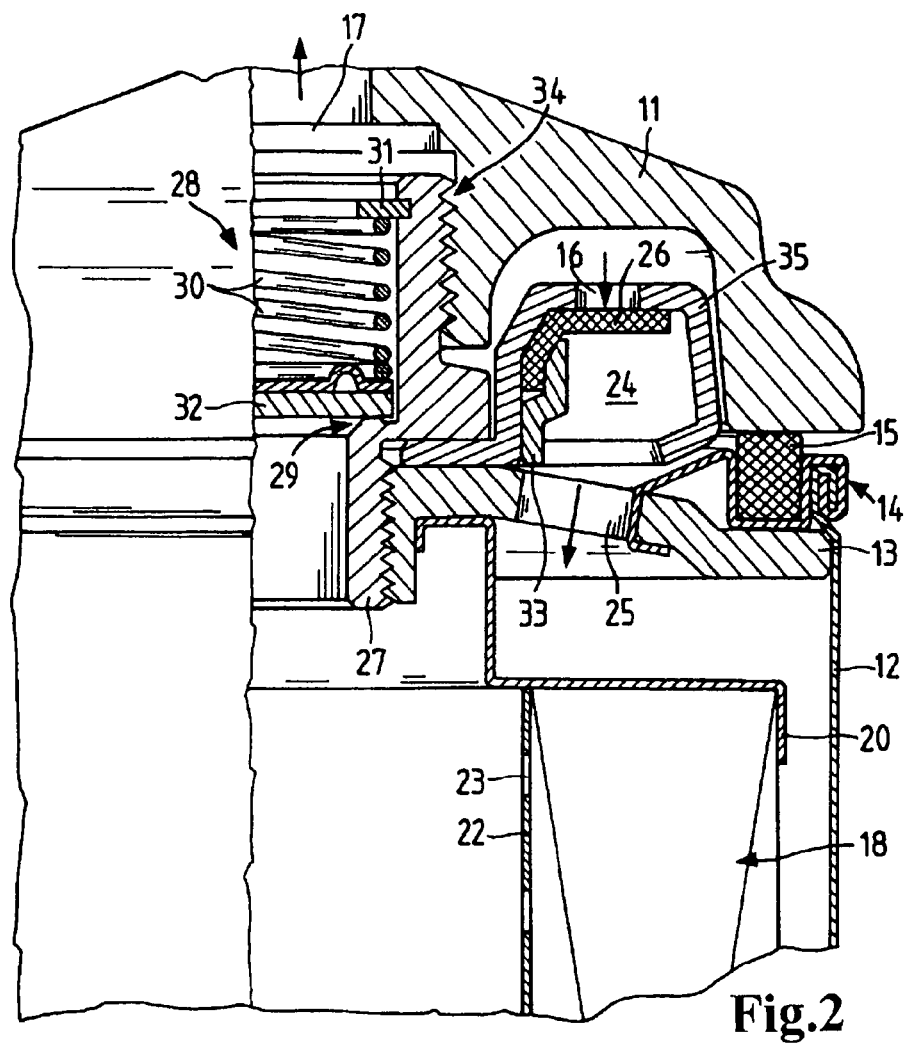
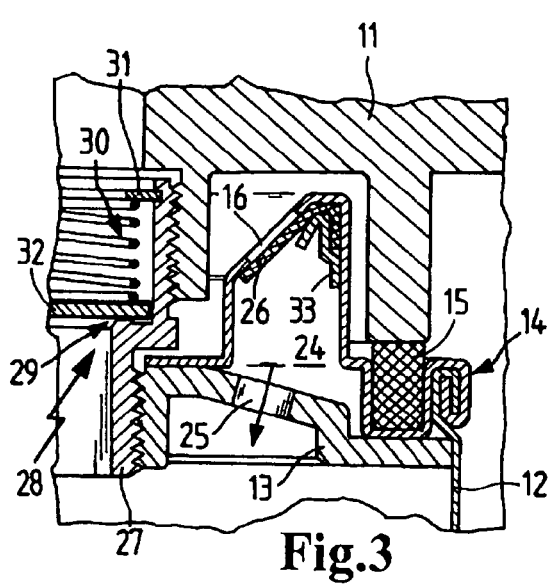
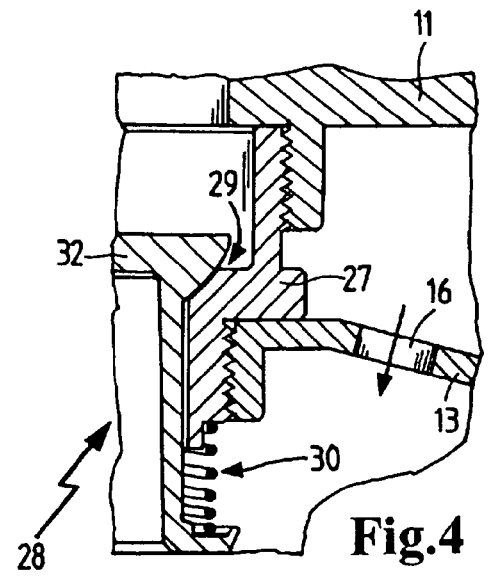

REPLACEABLE LIQUID FILTER

BACKGROUND OF THE INVENTION

The present invention relates to a replaceable liquid filter, particularly for the lubricating oil of an internal combustion engine, with a filter element disposed between a feed opening and a discharge opening in a cup-shaped housing.

Replaceable liquid filters, which are also referred to as spin-on filters, are known in the art and generally comprise a cup-shaped housing with an end plate and a top plate which secures the end plate in place. The liquid to be filtered is supplied through feed openings formed in the end plate, which are arranged surrounding a concentrically disposed outlet opening. A hollow cylindrical filter element is disposed between the inlet and the outlet, and the inlet and the outlet each have a backflow check valve element. A backflow check valve membrane is disposed over the inlet openings, and a backflow check valve is arranged in the interior of the hollow cylindrical filter element. This prevents the filter element from running empty when the internal combustion engine is stopped.

A drawback of this known arrangement is that in replaceable liquid filters which are not arranged in a suspended manner, the liquid present above the backflow check valve and the liquid present in the groove-shaped supply channel of the cylinder head leaks out when the replaceable liquid filter is detached for servicing and thus contaminates the engine compartment and/or the environment.

SUMMARY OF THE INVENTION

It is an object of the present invention to provide an improved replaceable liquid filter.

Another object of the invention is to provide a replaceable liquid filter which avoids leakage of liquid when the filter is detached for servicing.

An additional object of the invention is to provide a replaceable liquid filter which is cost-effective and simple to manufacture.

These and other objects are achieved in accordance with the present invention by providing a replaceable liquid filter comprising a substantially cup-shaped housing with a concentrically disposed outlet opening for filtered liquid and at least one inlet opening for liquid to be filtered, and a filter element disposed in a sealing manner between the housing inlet opening and the outlet opening, wherein the housing is connected to a top plate, and the top plate is coupled to an end plate and encloses a displacement space which is disposed in an oil feed chamber in a part which mates with the oil filter; an inlet opening in the top plate is disposed in the area of the displacement space; and a backflow check valve is disposed in the area of the outlet opening axially outside the effective filter element surface.

The invention thus relates to a replaceable liquid filter, particularly for the lubricating oil of an internal combustion engine, which comprises a substantially cup-shaped housing with a concentrically disposed outlet opening for filtered liquid and at least one inlet opening for liquid to be filtered. A preferably hollow, cylindrical, zigzag-pleated filter element is disposed in a sealing manner between the inlet opening and the outlet opening. The housing is closed off by a top plate, and the top plate is connected to an end plate. The housing and the top plate are preferably joined via a crimped edge in the outer region of the top plate, and the end plate is likewise connected to the top plate by a form-locking connection method. Furthermore, the top plate preferably encloses a displacement space disposed in an inlet chamber in a member to which the replaceable filter is matingly attached. This inlet chamber in the mating part is, for example, a circumferential supply groove within the cylinder head. The enclosure of the displacement space by the top plate substantially follows the contour of the inlet chamber, such that when the replaceable liquid filter and the mating part are assembled, the displacement space is disposed within the mating part. The inlet opening to the replaceable liquid filter is thus also disposed in the region of the mating part that is enclosed by a portion of the top plate. Preferably, a plurality of inlet openings are disposed circumferentially in the displacement space. Alternatively, or in addition, a backflow check valve valve is disposed in the area of the outlet opening, such that the backflow check valve is positioned axially outside the effective filter element surface. The backflow check valve is preferably disposed as far as possible toward the end of the outlet opening. Arranging the displacement space and/or the backflow check valve in the area of the outlet opening has the advantage that when the replaceable liquid filter is exchanged, the liquid remains in the replaceable filter and is not released to the surrounding environment.

In accordance with one advantageous embodiment of the invention, the backflow check valve comprises a spring to urge a valve member against a sealing face, such that the spring remains under compression. The spring thus applies pressure to a valve disk, which is thereby pressed against a sealing face to create a sealed connection. The spring may, for example, comprise a helical spring or a compressible medium which applies a pressure force as it expands.

Alternatively, the spring for urging the valve member against the sealing face may also be tension loaded. In this case, the spring engages a predefined contour within the replaceable liquid filter and pulls a valve disk against a sealing face to create the tight seal. The spring means may, for example, be again a helical spring or a medium subject to a negative pressure, which tends to contract. In both cases, the valve characteristic may be adjusted through appropriate selection of the spring, such that the backflow check valve can be adjusted to open or close as a function of the prevailing pressure conditions.

It is advantageous to dispose a backflow check valve membrane in the vicinity of the displacement space. The backflow check valve membrane prevents the liquid from flowing out of the replaceable liquid filter when the filter is detached for servicing. The backflow check valve membrane is preferably made of a synthetic resin material (i.e., plastic) or rubber and seals the liquid inlet when the internal combustion engine is stopped. When the internal combustion engine is running, the backflow check valve membrane, because of its ability to flex, unblocks the liquid inlet as a result of the oil pressure prevailing at the filter inlet.

The backflow check valve membrane is preferably permanently connected to the top plate. Such a permanent connection may be realized, for example, through adhesive bonding or fusion welding.

In accordance with another embodiment of the invention, the top plate is provided with a seal at its axial outer end to seal the connection between the replaceable liquid filter and the mating part, particularly a cylinder head. Preferably, a circumferential groove is formed in the top plate, which receives, for example, an O-ring or a cut square gasket to axially seal the connection between the filter and the mating part.

In accordance with yet another advantageous embodiment of the invention, a connecting element for releasably connecting the replaceable liquid filter to a mating part is disposed concentrically in the area of the cover plate. The connecting element extends axially beyond the contour of the replaceable liquid filter. Thus, the connecting element between the replaceable liquid filter and the mating part is transferred from the replaceable liquid filter into the mating part. As a result, a threaded nipple, which is needed in the prior art to connect a standard replaceable liquid filter to the cylinder head, becomes unnecessary, so that, on the one hand, a costly threaded nipple may be eliminated and, on the other hand, the outlet diameter can be enlarged by the portion otherwise taken up by the threaded nipple.

It is advantageous if the releasable connecting element comprises a concentric annular collar with an external thread. The concentric annular collar with the external thread can be screwed directly into the mating part, in this case into the cylinder head, for example. In combination with the backflow check valve described above, which in this case is disposed in the concentric annular collar, this arrangement has the advantage that a large amount of liquid is retained in the replaceable liquid filter by the backflow check valve, which in the prior art systems would leak out when the filter is replaced.

In accordance with yet another embodiment of the invention, the releasable connecting element is integrally formed with the end plate. The end plate, which is preferably made of metal and especially preferably produced by deep drawing, has at least one end opening which communicates with the at least one inlet opening of the filter housing. This end opening may be the inlet opening itself or, if the displacement space is disposed in the top plate, the liquid flows through the inlet opening in the top plate and then through the end opening in the end plate into the interior of the replaceable liquid filter.

Alternatively, the releasable connecting element may be releasably or permanently connected to the end plate so as to form a seal. The connection may be realized, inter alia, by adhesive bonding, fusion welding or via a firm screwed connection. Again in this case, the end plate furthermore has at least one opening, which communicates with the at least one inlet opening of the housing.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures, in which:

FIGS. 2 through 10 are enlarged partial views of alternative replaceable liquid filter embodiments according to the invention showing the detail region Z of FIG. 1.

DETAILED DESCRIPTION OF PREFERRED EMBODIMENTS

Figure 1:
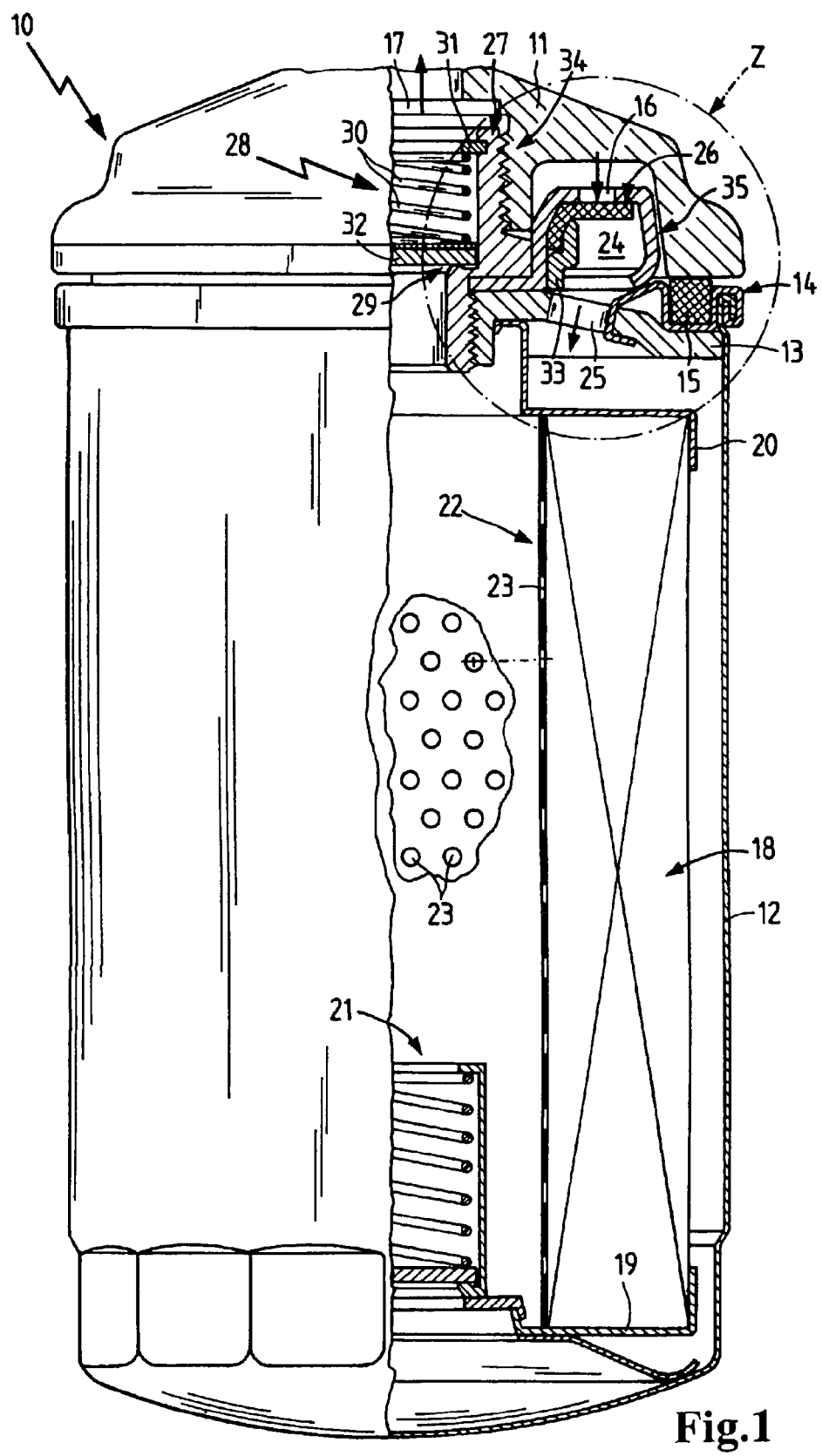
FIG. 1 is a partial sectional view a replaceable liquid filter according to the present invention.

FIG. 1 shows a replaceable liquid filter 10, which is mounted to a connecting flange on a cylinder head 11. The replaceable liquid filter 10 has a cup-shaped housing 12, which is preferably made of metal but which may also be made of synthetic resin material, i.e. plastic. In the region of the connection between the cylinder head 11 and the replaceable liquid filter 10, the replaceable liquid filter 10 comprises an end plate or cover plate 13, which is held in place by a top plate 14. The cup-shaped housing 12 is connected to the top plate 14 via a crimped edge, and the end plate 13 is connected to the top plate 14 by some type of form-locking or interlocking connection.

To seal the joint between the replaceable liquid filter 10 and the cylinder head 11, a square gasket 15 is arranged in a groove formed in the top plate 14. This square gasket 15 axially seals the replaceable liquid filter 10 relative to the cylinder head 11.

The replaceable liquid filter 10 further comprises an inlet opening 16 and an outlet opening 17, which are separated from one another in a sealed manner by a filter element 18. Filter element 18 is preferably a hollow, cylindrical, zigzag-pleated filter element and comprises a lower end disk 19 and an upper end disk 20. Lower end disk 19 has an integrated pressure regulating valve 21. If the filter element 18 is blocked or clogged, pressure regulating valve 21 opens and thus serves to provide a direct passage from the unfiltered side to the filtered side, thereby bypassing the filter element 18. This is a simple way to prevent damage to the internal combustion engine if the filter element becomes clogged or blocked.

A support tube 22 with openings 23 is disposed in the interior of the filter element 18 to stabilize the filter medium against pressure pulsation. Connected to the end plate 13 and the top plate 14 is a volume contour 35, preferably made of metal, which comprises the inlet opening 16 on the one hand and extends into the cylinder head 11 on the other hand. This creates a displacement space 24. The liquid to be filtered, particularly the lubricating oil of the internal combustion engine, flows from the cylinder head 11 through the inlet opening 16 into the displacement space 24 and from there via a passage 25 into the unfiltered liquid space annularly surrounding filter element 18 of the replaceable liquid filter 10.

In the displacement space 24, a backflow check valve membrane 26 is attached via a holder 33. The backflow check valve membrane 26 is preferably made of a flexible, elastic synthetic resin or rubber material and closes the opening 16 when the internal combustion engine is stopped.

A connecting collar 27 is disposed concentrically inside the replaceable liquid filter 10 in the area of the connection between the replaceable liquid filter 10 and the cylinder head 11. This connecting collar is firmly connected to the cover plate 13 and the volume contour 35 and in the region protruding beyond the replaceable liquid filter 10 has an external thread to produce a threaded connection 34 with the cylinder head 11.

A backflow check valve 28 is disposed in the interior of the coupling collar 27 in the area of the connection to the cylinder head 11. Backflow check valve 28 comprises a valve seat 29, a compression spring 30 held by mounts 31 which act as counterbearings, and a valve disk 32, such that the valve disk 32 is pushed against the valve seat 29 by the force of the compression spring 30 to create a tight seal when the internal combustion engine is stopped.

Backflow check valve 28 is integrated directly into the outlet opening 17 of the replaceable liquid filter 10 and is likewise intended to prevent the filter from emptying when the internal combustion engine is stopped. Disposing the backflow check valve 28 in the outlet opening 17 and the backflow check valve membrane 26 within the displacement space 24 has the advantage that if an upright replaceable liquid filter 10 is used, no oil can flow out of the replaceable liquid filter when it is detached for servicing, so that contamination of the surroundings and the environment is avoided.

FIG. 2 shows an enlargement of the region identified by reference character Z in FIG. 1. In this enlarged view, it can be more easily seen how the compression spring 30 is held by the mounts 31 which are formed by the coupling collar 27 and act as counterbearings, and how the valve disk 32 in turn is pressed against the valve seat 29.

FIGS. 3 through 10 show enlarged detail views of additional embodiments in region Z of FIG. 1, in which corresponding elements are identified by the same reference numerals.

FIG. 3 shows a variant in which the inlet opening 16 is not disposed parallel to the filter element 18, but is at an angle of approximately 45 degrees thereto. The other elements in this embodiment correspond to those is FIGS. 1 and 2. This angled placement of the inlet opening 16 has the advantage that the mount 33 for the backflow check valve membrane 26 may be constructed as a clamping ring or alternatively even be injection molded onto the backflow check valve membrane. This also protects the backflow check valve membrane 26 if the liquid flowing in from the cylinder head 11 does not strike the check valve membrane 26 directly, but instead at an angle.

FIG. 4 shows an alternative arrangement of the backflow check valve 28. In this embodiment, the valve seat 29 is formed by the connecting collar 27, and the valve disk 32 is pulled instead of pushed against the valve seat 29 due to to the reversed arrangement of the compression spring 30.

Figure 5:
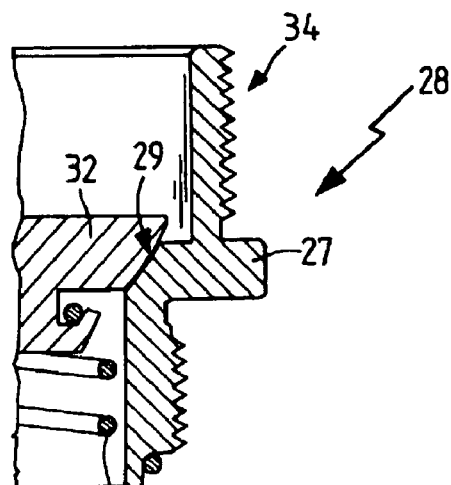

FIG. 5 shows another option for configuring the backflow check valve 28. In this case, the valve disk 32 is pulled against the valve seat 29 by a tension spring 36. The valve seat 29 is again located on the coupling collar 27, and the anchoring point for the tension spring also is formed on the connecting collar 27.

Figure 6:
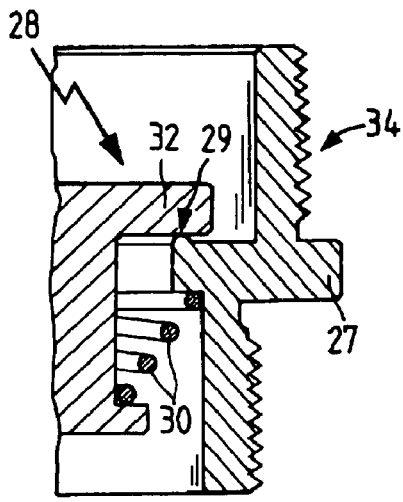

The valve disk 32 of FIG. 6 is pushed against the valve seat 29 and simultaneously centered by a conical compression spring 30. The valve seat 29 is again constructed on the connecting collar 27.

Figure 7:
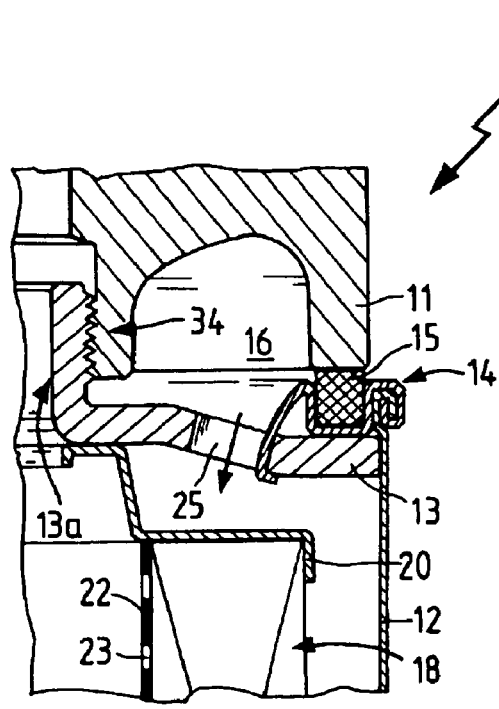

FIG. 7 shows a variation in which the connecting collar 27 is formed through a special embodiment of the cover plate 13. Because the displacement space 24 is not used here, the inlet opening 16 is formed in the end plate 13. The end plate 13 is preferably deep-drawn such that a concentric annular collar 13a is formed in its interior and can then engage with the cylinder head 11 in a screwed connection 34.

Figure 8:
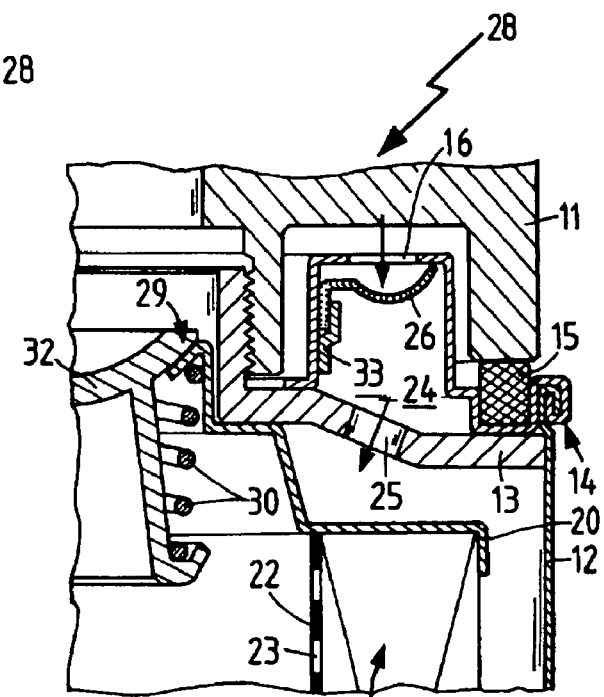

In FIG. 8 the top plate 14 forms the displacement space 24. The inlet opening 16 is then formed in the top plate 14, and a backflow check valve membrane 26 is again disposed on the top plate 14 via the mount 33. The liquid coming out of the cylinder head 11 thus flows through the inlet opening 16 into the displacement space 24 and from there through the passage 25 in the end plate 13 into the unfiltered liquid chamber of the replaceable liquid filter 10. Here, the counterbearing element for the compression spring 30 of the backflow check valve 28 is formed by the upper end disk 20 of the filter element 18. At the same time, the end disk 20 also forms the valve seat 29 for the valve disk 32.

Figure 9:
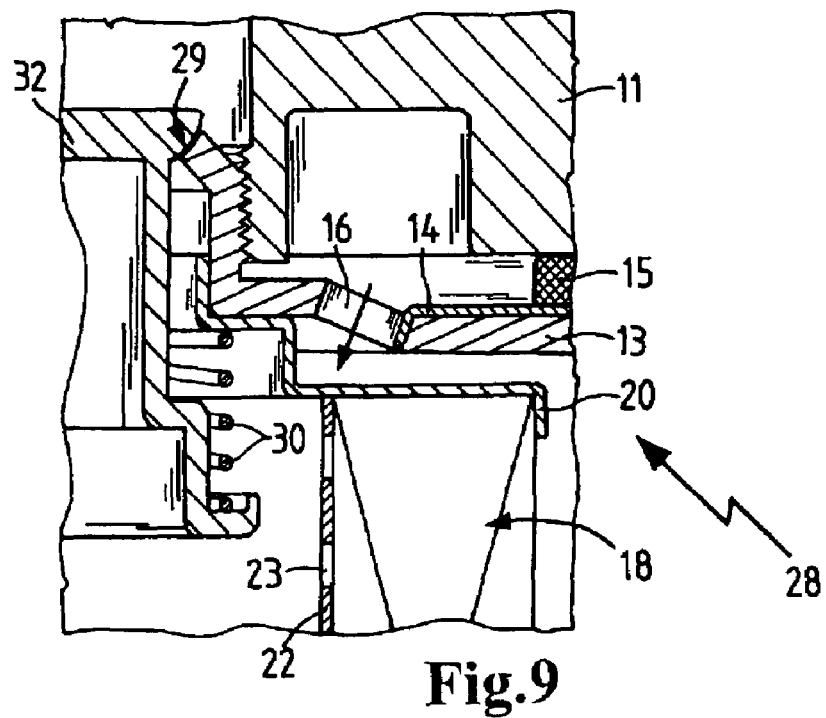

Alternatively, as shown in FIG. 9, the valve seat 29 may also be formed by a suitable configuration of the cover plate 13, such that the upper end disk 20 acts only as a counterbearing for the compression spring 30. The sealing face of the backflow check valve valve 28 is formed by the valve seat 29 of the cover plate and the valve disk 32.

Figure 10:
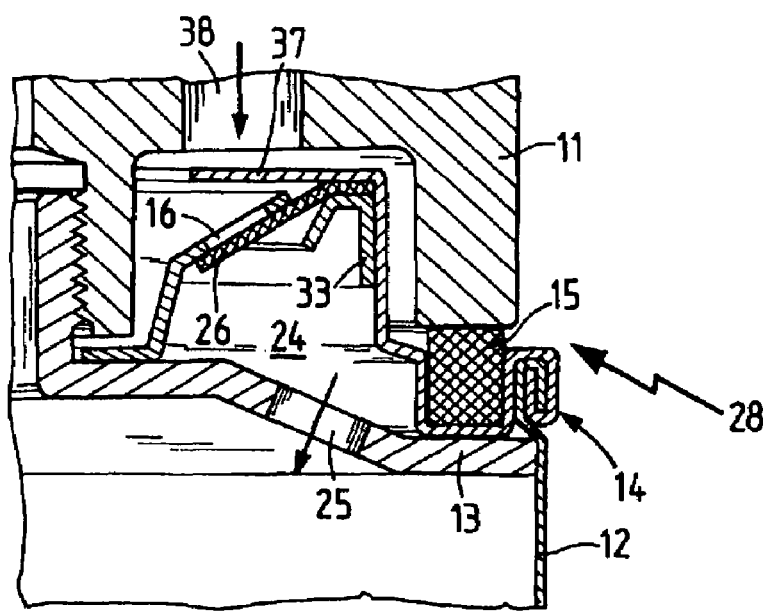

To protect the backflow check valve membrane 26, it is also possible to form a baffle plate 37 as part of the top plate 14 as shown in FIG. 10 to cover a certain region of the backflow check valve membrane 26 and thereby prevent direct contact between the inflowing liquid and the backflow check valve membrane 26. In this embodiment, it may be seen that the liquid flowing through the inlet opening 38 formed in the cylinder head 11 would strike the backflow check valve membrane 26 directly.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A replaceable liquid filter comprising:
   a substantially cup-shaped housing with a concentrically disposed outlet opening for filtered liquid and at least one inlet opening for liquid to be filtered, and
   a filter element disposed in contact with an end plate in a sealing manner between the inlet opening and the outlet opening, said filter element defining an effective filter element surface, wherein:
   the housing is connected to a top plate, and the top plate is coupled to said end plate and encloses a displacement space which is disposed exteriorly of said end plate in a liquid feed chamber in a part which mates with the liquid filter;
   an inlet opening in the top plate is disposed in the area of the displacement space;
   a check valve is disposed in said displacement space which prevents return flow from said displacement space through the inlet opening in the top plate such that liquid cannot leak from the filter when the filter is detached for replacement; and
   a backflow check valve is disposed in the area of the outlet opening axially outside the effective filter element surface.

2. A filter according to claim 1, wherein the backflow check valve comprises a compression spring which urges a valve member against a sealing face.

3. A filter according to claim 1, wherein the backflow check valve comprises a tension spring which urges a valve member against a sealing face.

4. A filter according to claim 1, wherein the check valve in the displacement space is a membrane check valve.

5. A filter according to claim 4, wherein the check valve membrane is permanently connected to the top plate.

6. A filter according to claim 1, wherein the top plate is provided with an axial seal for sealing the filter to a mating part.

7. A filter according to claim 1, wherein a connecting element for releasably connecting the filter to a mating part is disposed concentrically in the area of the end plate, said connecting element extending axially beyond the contour of the replaceable liquid filter.

8. A filter according to claim 7, wherein the releasable connecting element comprises a concentric annular collar having an external thread.

9. A filter according to claim 7, wherein the releasable connecting element is integrally formed from the end plate, and the end plate has at least one opening which communicates with the at least one housing inlet opening.

10. A filter according to claim 7, wherein the releasable connecting element is releasably connected to the end plate in a sealing manner.

11. A filter according to claim 7, wherein the releasable connecting element is permanently connected to the end plate in a sealing manner, and the end plate has at least one opening which communicates with the at least one housing inlet opening.

12. A filter according to claim 1, wherein the housing inlet opening is connected to a lubricating oil channel in a cylinder head of an internal combustion engine.

* * * * *